Nov. 19, 1963 H. L. LEVI 3,111,582
RADIOGRAPHIC ATTACHMENT FOR POSITIONING RADIO TRANSPARENT
SCALES CONTAINING RADIO OPAQUE MARKS
Filed July 24, 1961
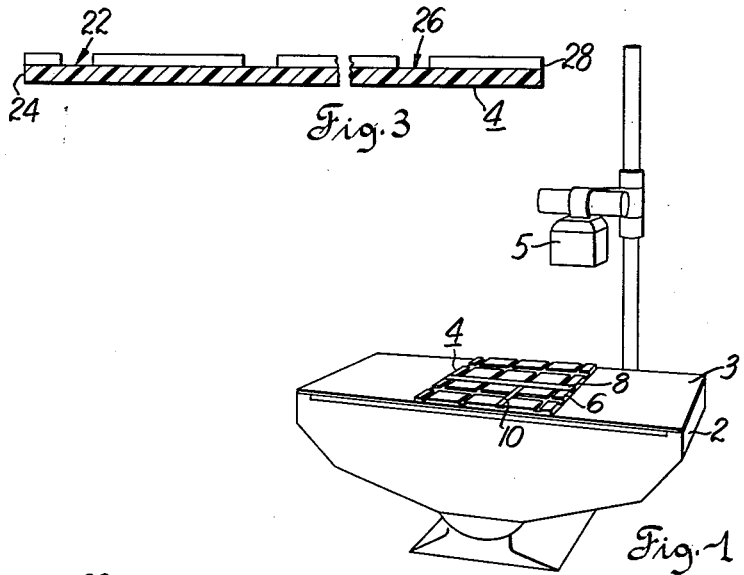
Fig. 3
Fig. 1
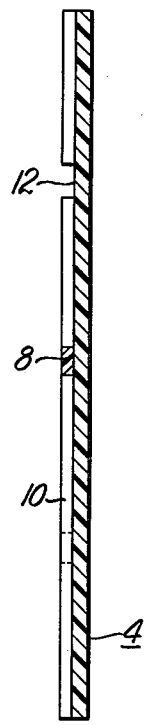
Fig. 4
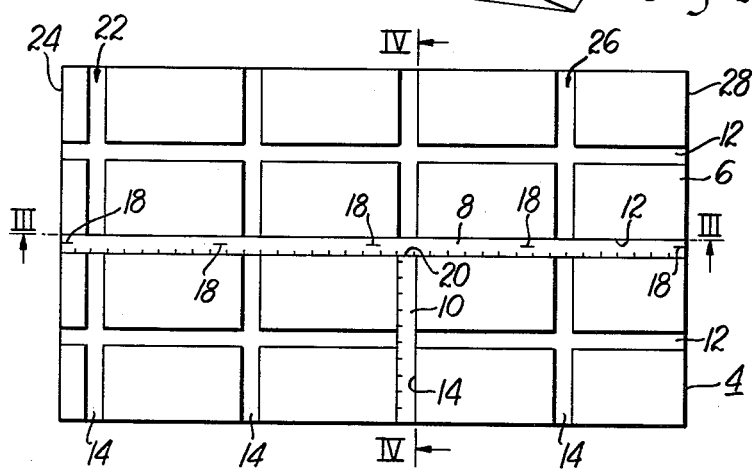
Fig. 2
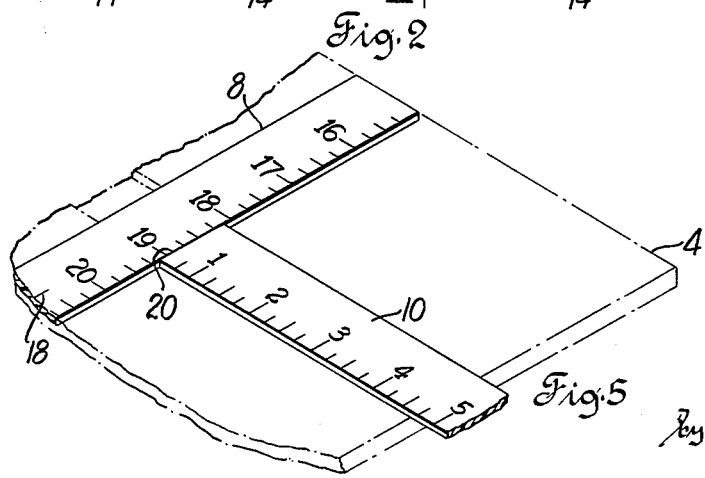
Fig. 5
Inventor
Harry L. Levi
By Howard B. Scheckman
Attorney

United States Patent Office 3,111,582
Patented Nov. 19, 1963

3,111,582
RADIOGRAPHIC ATTACHMENT FOR POSITIONING RADIO TRANSPARENT SCALES CONTAINING RADIO OPAQUE MARKS
Harry L. Levi, 1204 E. Olive St., Shorewood, Wis.
Filed July 24, 1961, Ser. No. 126,007
4 Claims. (Cl. 250—59)

This invention relates to radiography and more particularly to an improved attachment to reproduce the divisions of a scale in a radiograph.

One of the difficulties in radiography is to accurately measure the object that has been radiographed. The reason is that the object, as it appears in the radiograph, is not shown in its true size.

It is known to provide a ruler that contains a series of radio opaque dots a known distance apart. Then a radiograph is made of the object, such as a body member, and the ruler. The dots appear in the radiography, and the body member is then compared with the dots for measurement.

This arrangement however has not proven to be completley satisfactory. This is because it is possible to make an error in counting the number of dots in the radiography. It is easy to confuse where the counting started and where it stopped with respect to the dots. Also, the number of dots must be computed and then converted into the scale used.

Another problem is that it is difficult to accurately position the ruler and to maintain it securely in position while it is being radiographed.

It also has not been possible to accurately and easily move the ruler to different positions relative to the object being radiographed, particularly if a series of radiographs are to be taken.

It also has not been possible to make accurate longitudinal or transverse measurements in any selected area of the radiograph.

Nor, has it been possible to securely hold several independent rulers in selected relative positions.

It is an object of this invention to provide a radiography attachment containing a scale that can be read directly from the radiograph without requiring computation.

It is another object of this invention to provide a radiography attachment containing a scale that can be moved to different positions and maintained in said positions.

It is also an object of this invention to provide a radiography attachment containing a plurality of scales that can be accurately positioned and held in various selected positions.

It is also an object of this invention to provide a radiography attachment that permits conditions to be easily reproduced for future radiographs.

Other advantages and objects will appear from the following description considered in conjunction with the attached drawings, in which:

FIG. 1 is a perspective vie wof an X-ray machine with the attachment on the surface of the X-ray table;

FIG. 2 is an enlarged plan view of the attachment showing its various grooves;

FIG. 3 is a sectional view of FIG. 2 taken in the direction of arrows III—III showing a section through the attachment;

FIG. 4 is a sectional view of FIG. 2 taken in the direction of arrows IV—IV showing the placement of the scales in the grooves; and FIG. 5 is an enlarged fragmentary view of FIG. 2 showing the scales, particularly the transverse scale's numbering starting from the center line of the longitudinal scale.

Referring to the drawings, the invention contemplates providing a radiography apparatus, such as an X-ray machine 2, having X-ray table surface 3, and X-ray tube 5, with an attachment 4 comprising a holder 6 and scales 8 and 10.

Holder 6 has a plurality of longitudinal parallel grooves 12 and a plurality of parallel grooves 14 that are perpendicular to groves 12. Grooves 12 and 14 are in the same plane. The spacing between adjacent parallel grooves is equal. Holder 6 is rectangular and is made of a radio transparent material. Holder 6 (FIG. 1) is made the same width as X-ray table 3.

Scales 8 and 10 are optically transparent for easy positioning in grooves 12, 14. Scales 8 and 10 are also radio transparent so as not to interfere with the object in the radiograph. Each scale contains a series of numbers and lines that are radio opaque.

The object to be radiographed (not shown) is positioned on holder 6. The scales are then positioned in the most convenient grooves, either under, or along side the object to be radiographed. When the radiograph is taken, the numbers will appear in the radiograph for measurement.

It will be noted that the numbers on transverse scale 10 do not start from zero. The zero point is radio opaque center line 18 on scale 8, and not front end 20 of scale 10. Center line 18 is made up of a series of dashes. Dashed center line 18 will appear the length of the radiograph, and transverse measurements can be made from this zero line. A dashed line 18 is used because there is less chance for interference with the object in the radiograph. If scale 8 is one inch wide, then center line 18 will be one-half inch from each edge. End 20 of scale 10 will start at one-half inch and not zero.

Groove 22 (FIG. 3) is closer to end 24 of holder 6, than groove 26 is to end 28. Thus, if holder 6 is rotated 180°, this will in effect shift transverse grooves 14 to change their relative position.

While only one holder is illustrated, a second similar holder (not shown) can be provided where the object of body member to be radiographed is quite large. In that case, end 24 of one holder would be secured against end 28 of the second holder. The distance from groove 22 to end 24, plus the distance from groove 26 to end 28 is equal to the distance between adjacent parallel grooves. This will provide a series of equally spaced transverse grooves 14 from the free end of one holder to the free end of the other holder. If desired, one holder can also be rotated 180° relative to the other holder to shift one set of transverse grooves in one holder relative to the transverse grooves in the second holder.

While holder 6 is illustrated as of substantial thickness, in actual practice it can be made quite thin, in the order of 3/16 of an inch, the grooves and scales being about 1/8 of an inch. The thickness of the holder will depend on the rigidity desired.

Two scales 8, 10 are shown in holder 6 for purposes of illustration. However, any number of scales can be used. This would depend on the object to be radiographed. The scales can be placed in any of the grooves. This would also depend on the object to be measured.

Operation

Assume that a body member is to be radiographed. The body member is placed on holder 6. Scales 8 and 10 are placed in the grooves that are close to the body member. Their numbers will be projected onto the radiograph.

Grooves 12 and 14 accurately position scales 8 and 10 and hold them securely in position. The grooves also permit the scales to be moved to different preselected positions.

Similar conditions can be reproduced with attachment 4 so that future radiographs can be taken for purposes of comparison. That is, the location of attachment 4 on the table 3 can be recorded, as well as the position of scales 8 and 10. When a later radiograph is desired, the conditions can be easily reproduced.

Since the body member and scales are at similar distances from the focus of the X-ray tube 5, measurements obtained will be close to true.

While holder 6 and scales 8, 10 will provide numbers in two dimensions, the attachment can be used for three dimensional work. In that case, holder 6 would be used to provide two dimensions, and a third scale (not shown) would be positioned perpendicular to X-ray table surface 3. A second horizontal radiograph would then be taken perpendicular to the first radiograph. The two radiographs taken together will permit the object to be located in space, since the X, Y, and Z coordinates will be known.

In some cases where a smooth holder surface is desired, the empty grooves in the holder 6 can be filled with "blanks" that are the same size as the scales.

From the foregoing it will be apparent to those skilled in the art, that various changes and modifications may be made therein without departing from the spirit of the invention, or the scope of the appended claims.

It is claimed and desired to secure by Letters Patent:

1. In an attachment for use in radiography, the combination comprising: a first scale that is radio transparent, said first scale containing numbers that are radio opaque; a second scale that is radio transparent, said second scale containing numbers that are radio opaque; and, a holder that is radio transparent, said holder constructed with grooves to position said first scale in a first position relative to the table surface of a radiography apparatus, and to position said second scale in a position transverse to said first position of said first scale.

2. A device as set forth in claim 1, wherein said first scale is provided with a longitudinal line; and, said second scale's numbers begin with said longitudinal line as the zero base line.

3. In an attachment for use in radiography of an object, the combination comprising: a first scale that is radio transparent containing numbers that are radio opaque; a holder that is radio transparent and constructed to position said scale relative to the table surface of a radiographic apparatus, said holder being constructed with a plurality of parallel grooves in which said scale is selectively positionable to vary said scale position relative to said holder and to the object being radiographed; a second scale that is radio transparent containing numbers that are radio opaque; a second plurality of parallel grooves extending transversely to said first plurality of parallel grooves, said second scale being selectively positionable in a selected groove of said second plurality of parallel grooves to vary said second scale position relative to the object being radiographed.

4. In an attachment for use in radiography of an object, the combination comprising; a first scale that is radio transparent, said first scale containing numbers that are radio opaque; a second scale that is radio transparent, said second scale containing numbers that are radio opaque; a rectangular holder that is radio transparent, said holder being constructed with a first plurality of equidistant parallel grooves; said first scale being selectively positionable in a selected groove of said first plurality of grooves; said holder being constructed with a second plurality of equidistant parallel grooves that extend transversely to said first plurality of parallel grooves, said second scale being selectively positionable in a selected groove of said second plurality of grooves; said holder constructed with said second plurality of grooves being closer to one end of said holder than to the other end, said holder on being rotated through 180° being operable to shift the position of said second plurality of grooves relative to the object being radiographed.

References Cited in the file of this patent
UNITED STATES PATENTS

| | | |
|---|---|---|
| 1,396,920 | Brostrom | Nov. 15, 1921 |
| 1,904,234 | Hoskin et al. | Apr. 18, 1933 |
| 2,141,857 | Gamble | Dec. 27, 1938 |
| 2,293,324 | Vladeff | Aug. 18, 1942 |
| 2,650,308 | Catlin | Aug. 25, 1953 |